United States Patent [19]

Allemano

[11] Patent Number: 4,466,285

[45] Date of Patent: Aug. 21, 1984

[54] UNDERWATER INSTRUMENT FOR THE COMBINED READING OF IMMERSION TIME AND DEPTH, AND DECOMPRESSION TIME

[76] Inventor: Emilio Allemano, Via Rosolino Pilo, 4, 10139 Torino, Italy

[21] Appl. No.: 404,098

[22] Filed: Aug. 2, 1982

[30] Foreign Application Priority Data

Sep. 25, 1981 [IT] Italy ................. 53632/81[U]

[51] Int. Cl.³ ................. G06G 5/00; G01F 23/14
[52] U.S. Cl. ................. 73/432 R; 73/300; 368/281
[58] Field of Search ............. 73/432 D, 300; 368/316, 368/281, 279, 294, 295

[56] References Cited

U.S. PATENT DOCUMENTS

| | | | |
|---|---|---|---|
| 4,005,282 | 1/1977 | Jennings | 73/432 D X |
| 4,107,996 | 8/1978 | Hollingsworth et al. | 73/300 |
| 4,188,825 | 2/1980 | Farrar | 73/432 D X |

FOREIGN PATENT DOCUMENTS

351225 2/1961 Switzerland ................. 73/432 D

*Primary Examiner*—Gerald Goldberg
*Assistant Examiner*—Joseph W. Roskos
*Attorney, Agent, or Firm*—David A. Jackson; Daniel H. Bobis

[57] ABSTRACT

An underwater instrument for the combined reading of immersion time and depth, and decompression time, wherein a depthometer, a clock device and decompression tables are mounted in mutually adjacent positions on a single support element.

5 Claims, 6 Drawing Figures

4,466,285

UNDERWATER INSTRUMENT FOR THE COMBINED READING OF IMMERSION TIME AND DEPTH, AND DECOMPRESSION TIME

BACKGROUND OF THE INVENTION

This invention relates to an underwater instrument for the combined reading of immersion time and depth, and decompression time.

The need to control the correct execution of decompression pauses during underwater diving has led to the construction of a relatively large number of control instruments, which are generally relatively bulky and provide information of poor reliability. As an alternative to such instruments, the diver can use decompression tables which indicate the necessary number and duration of decompression pauses on the basis of the depth attained and the time for which he remains at said depth.

The data necessary for consulting the tables are read on control instruments of current use, such as a depthometer and an underwater timer. These instruments are however not designed for use in conjunction with the decompression tables, and therefore do not directly provide all the information which the diver requires. Finally, such instruments, and in particular the decompression tables, obstruct the driver's movements, and their consultation is generally a laborious task.

SUMMARY OF THE INVENTION

The object of the present invention is to provide an instrument able to obviate all the aforesaid drawbacks, and to provide the diver with a set of information which can be used directly, i.e. without requiring any further calculation, in order to obtain from the decompression tables the data relative to the manner in which he has to ascend.

A further object of the present invention is to provide the driver with said information in an extremely simple and rational manner, so as to drastically reduce the possibility of reading errors.

Said objects are attained according to the present invention by an underwater instrument for the combined reading of immersion time and depth, and decompression time, characterised by comprising, in combination, a depthometer, a clock device, a support for decompression tables, and a casing on which said depthometer, clock device and support are mounted in mutually side-by-side positions so as to be simultaneously consultable.

BRIEF DESCRIPTION OF THE DRAWINGS

Further characteristics and advantages of the present invention will be apparent from the description given hereinafter with reference to the accompanying drawings, which illustrate one non-limiting embodiment thereof, and in which.

DETAILED DESCRIPTION OF THE INVENTION

Figure 1:
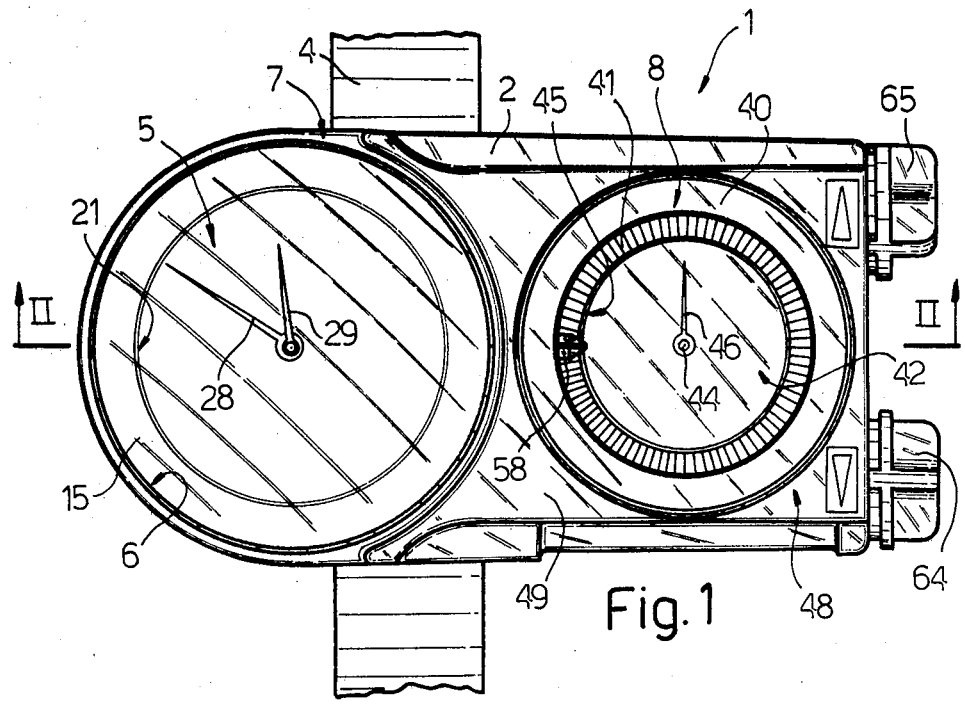
FIG. 1 is a plan view of an underwater instrument constructed according to the present invention.
Figure 2:
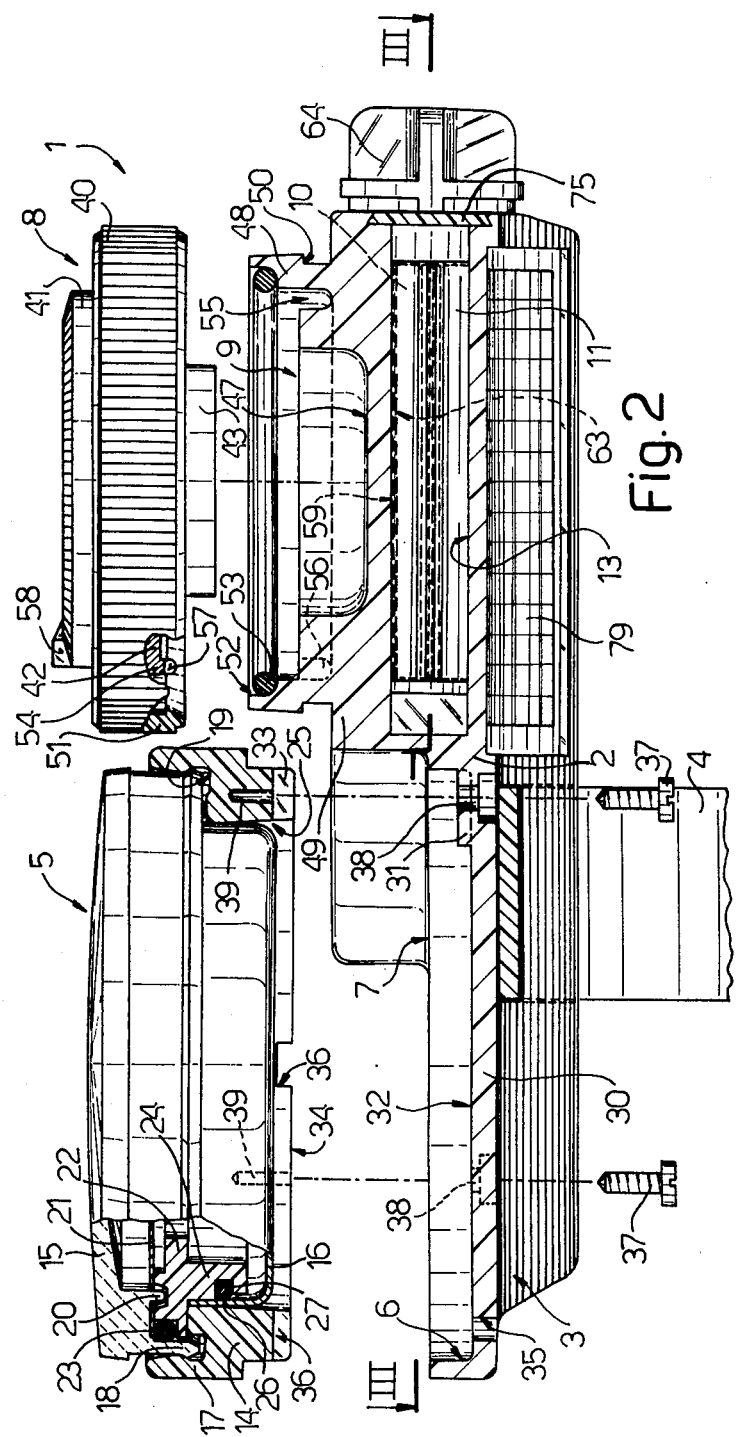
FIG. 2 is a partly exploded section on the line II—II of FIG. 1.
Figure 3:
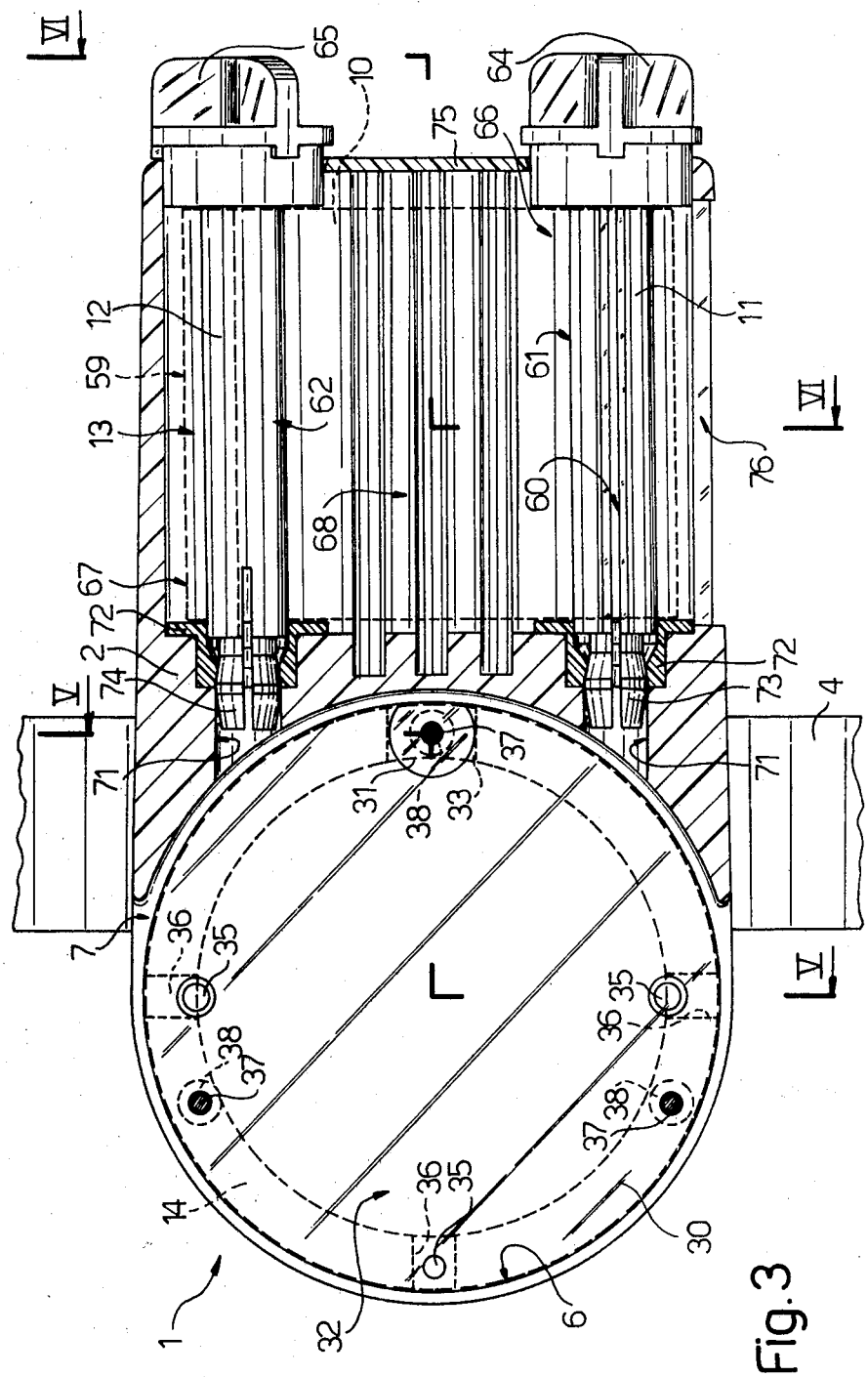
FIG. 3 is a section on the line III—III of FIG. 1.
Figure 6:
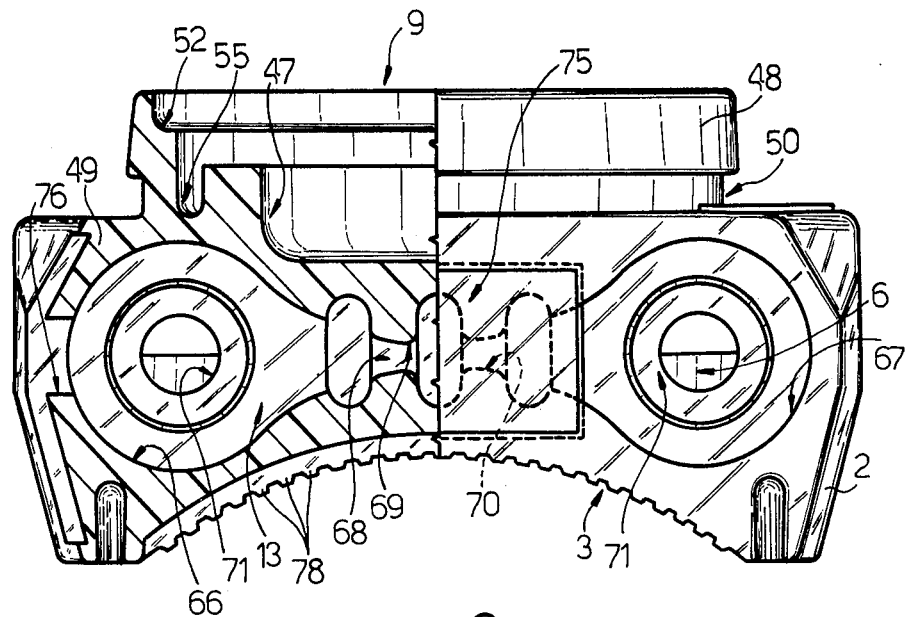
FIGS. 5 and 6 are sections through a second detail of the instrument of FIG. 1, taken on lines V—V and VI—VI of FIG. 1.

In FIGS. 1, 2 and 3, the reference numeral 1 indicates overall an underwater instrument comprising a casing 2 of substantially elongated parallelepiped shape. The casing 2 is arranged for fixing to a user's arm, and comprises a rear concave surface 3 and a strap 4 for fixing the casing 2 to an arm of said user.

The instrument 1 comprises a depthometer 5 housed in a cup seat 6 formed transversely in a substantially flat front surface 7 of the casing 2 opposite the surface 3, a clock device 8, in particular a minute timer, housed in a cap seat 9 provided transversely in the casing 2 in a position adjacent to the seat 6, and a flexible band 10, the ends of which are held in opposite directions about two parallel drums 11 and 12 which are housed in a seat 13 provided longitudinally in the casing 2 between the seat 9 and surface 3.

The depthometer 5 comprises an annular element 14 housed in the seat 6 and closed in a fluid-tight manner at its ends by a transparent cover 15 and by a diaphragm 16 facing the surface 3.

The cover 15 is rotatably housed in an appendix 17 coaxial to the element 14 and extending from the front end thereof, and comprises a rear annular rim 18 which is snap-fitted into an annular groove 19 provided in the front end of the element 14 inside the appendix 17. The cover 15 is therefore free to rotate relative to the element 14, and is provided with a pin 20 for its angular connection to a dial 21 rotatably housed in the element 14. In this latter there is also housed an annular support member 22 for the dial 21. The member 22 is provided with an annular seal gasket 23 which is inserted between it and the rim 18. The member 22 also comprises a rear tubular appendix 24 which is engaged in the element 14 and cooperates with an inner cylindrical surface 25 thereof in order to clamp the peripheral cylindrical edge 26 of the diaphragm 16 by way of an annular gasket 27 cooperating with the inner cylindrical surface of the edge 26 of the diaphragm 16. This latter is connected by way of a known transmission device, not shown, to a pointer 28 rotating on the dial 21, and to a pointer 29 which can be zeroed and which is arranged to move together with the pointer 28 only when this latter rotates in a predetermined direction, in order to indicate the maximum angular excursion of the pointer 28 between two successive zeroing operations.

Figure 4:
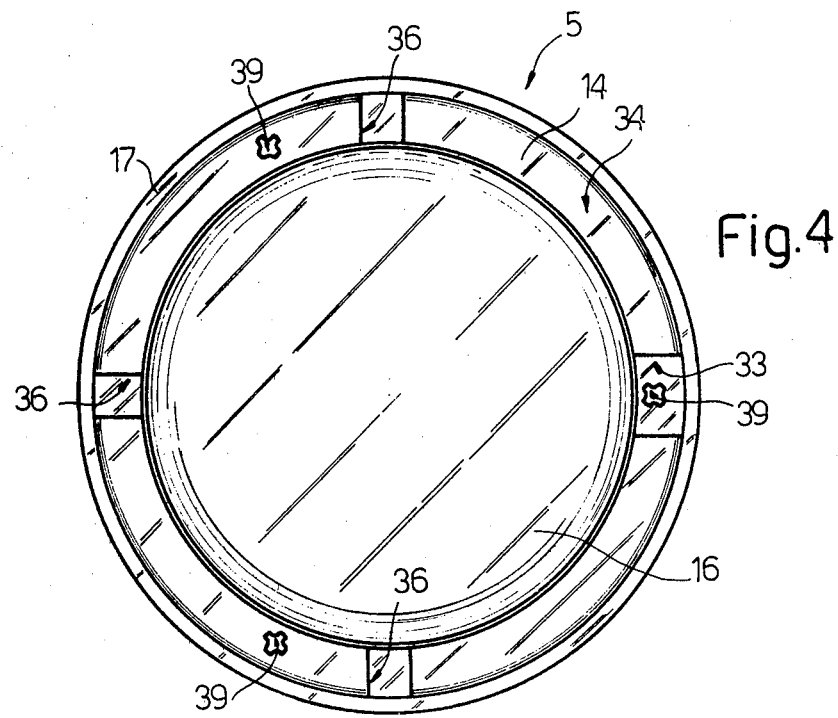
FIG. 4 is a plan view of a first detail of the instrument of FIG. 1.

With particular reference to FIGS. 3 and 4, the seat 6 comprises a base wall 30 provided with a peripheral raised portion 31 lying against the side surface of the seat 6. The raised centering portion 31 projects from that surface 32 of the wall 30 which faces the diaphragm 16, and is arranged to engage with a respective radial groove 33 provided in that rear end surface 34 of the annular element 14 facing the wall 30. The wall 30 is also provided with three through bores 35 disposed in positions corresponding with three radial grooves 36 provided in the surface 34. The bores 35 and grooves 36 are arranged to enable water to enter the seat 6 between the base wall 30 and the diaphragm 16. The element 14 is removably fixed in the seat 6 by screws 37 housed in respective bores 38 provided in the base wall 30, and in corresponding bores 39 provided in the element 14.

The minute timer 8 comprises an outer ring 40 and an inner ring 41 mounted rotatably in a concentric manner about a fixed transparent cover 42 able to be inserted in a fluid-tight manner in the seat 9. The minute timer 8 also comprises a clock mechanism 43 provided with a rotatable exit shaft 44 on which there is keyed a graduated dial 45 which makes one complete revolution in one hour. The mechanism 43 also rotates a pointer 46 which makes one complete revolution in one minute. The seat 9 is provided with a cavity 47 for housing the mechanism 43, and is formed in a tubular appendix 48 in the casing 2 which extends from the same side as the surface 7 and projects from a raised end 49 of the casing 2.

The tubular appendix 48 comprises externally a first annular groove 50 snap-engaged by the end of a side wall 51 of the ring 40, and comprises internally a second annular groove 52 which houses a gasket 53 arranged to cooperate with the transparent cover 42 in order to seal the seat 9 in a fluid-tight manner. The cover 42 is also provided with an annular rim 54 arranged for insertion into an annular cavity 55 of the seat 9 in which one or more radial fins 56 are disposed for insertion into respective grooves 57 provided in the rim 54, so as to prevent rotation of the cover 42. The ring 40 is arranged to cooperate by friction with the gasket 53, which thus also serves as a retention means for the ring 40 and enables this latter to be locked selectively in any angular position. The ring 41 is snap-mounted on the cover 42 in a manner not shown, and is provided with retention means, not shown, which enable it to be locked selectively in any angular position. The ring 41 is also provided with a reference marker 58 rigid therewith.

The flexible band 10 is constructed of an impermeable material, and a plurality of decompression tables are reproduced on a surface 58 thereof. These tables indicate partly empirical values relating to the duration of the necessary decompression pauses and their number, according to the depth and time for which the diver remains at this depth. In order to enable the band 10 to be wound on the drums 11 and 12, these latter are provided with longitudinal slots 60 parallel to the axis of the drums 11 and 12 in respective surfaces 61 and 62 of said drums 11 and 12. The slots 60 are arranged to fix the ends of the band 10 to the drums 11 and 12 respectively, in such a manner that when the drum 12 is rotated clockwise or the drum 11 anti-clockwise, the band 10 winds thereon by way of that surface 63 thereof which is opposite the surface 59. In order to enable the drums 11 and 12 to be rotated, they are provided with respective knobs 64 and 65 projecting from the casing 2.

With reference to FIG. 8, the seat 13 comprises two parallel substantially cylindrical cavities 66 and 67, the drums 11 and 12 being respectively disposed coaxially thereto. The cavities 66 and 67 are in communication with each other along their entire length by means of a central cavity 68 bounded by a front guide surface 69 and a rear guide surface 70. The surfaces 69 and 70 are arranged to cooperate with the band 10 in such a manner as to keep this latter at rest by friction in any selected position assumed by it. The cavities 66 and 67 also communicate with the seat 6 by way of respective bores 71 provided parallel to said cavities 66 and 67. The bores 71 are arranged to house bushes 72 into which there are snap-inserted respective elastically deformable heads 73 and 74 provided at that end of the drums 11 and 12 distant from the end on which the knobs 64 and 65 are provided. These latter are arranged to close the cylindrical cavities 66 and 67 towards the outside, while the central cavity 68 is snap-closed by a resilient plate 75.

Figure 5:
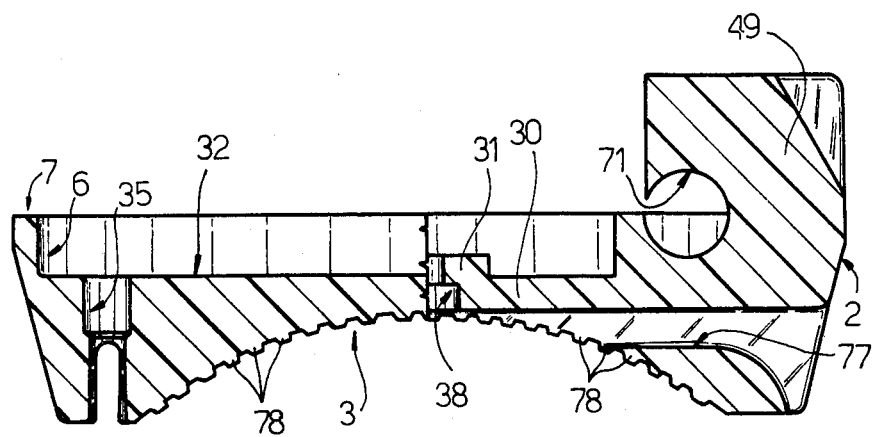

With reference to FIG. 5, the casing 2 is provided at the seat 13 with a longitudinal window 78 parallel to the drums 11 and 12, through which the surface 59 of the band 10 can be seen. The casing 2 is also provided with a transverse slot 77 through which the strap 4 passes.

Axial ribs 78 are provided along a first portion of the surface 3 disposed to the rear of the seat 6 in order to increase adherence between the surface 3 and the user's arm, and a second portion of the surface 3 disposed to the rear of the seat 9 carries correction tables 79 (FIG. 2) for the decompression tables, which relative to any immersions which follow the first immersion less than twelve hours after this latter.

The operation of the instrument 1 is as follows. Before beginning an immersion, the user zeroes the depthometer 5 by rotating the cover 15 in such a manner as to make the zero mark on the dial 21 coincide with the angular position of the pointer 28, in order to compensate for atmospheric pressure variations. The user also zeroes the minute timer 8 by rotating the ring 41 until the reference marker 58 corresponds with the angular position assumed at that moment by the zero mark on the dial 45. The clock mechanism 43, which is preferably of the automatic mechanical winding type, in fact contains no devices for adjusting the angular position of the exit shaft 44, so as to simplify its construction and ensure that the seat 9 is perfectly water-tight even at great depth.

When zeroed, the depthometer 5 and minute timer 8 operate independently, and indicate to the user the depth reached and the total immersion time respectively, this latter indicated at the reference marker 58 by the dial 42 which carries a scale, not shown, with a plurality of subdivisions. The pressure of the water which penetrates through the bores 35 deforms the diaphragm 16 in known manner, to cause a corresponding movement of the pointer 28. The pointer 29 is arranged to move forward only during the descent, so as to indicate the maximum depth reached at any moment. In addition, by rotating the ring 40, the user can check partial immersion times, for example the descent time or the time for which he remains at a certain depth. For this purpose, the ring 40 carries a scale, not shown, provided with a plurality of subdivisions each indicating one minute. If the subdivision corresponding to the required number of minutes is made to coincide with the zero mark on the dial 45, then this will indicate when the set time has passed on the scale of the ring 40.

When he is about to ascend, the user reads the maximum depth reached by means of the pointer 29, and the immersion time by means of the reference marker 58. In order to know how to regulate his decompression, the user either rotates the knob 65 clockwise or rotates the knob 64 anticlockwise (in the direction of the arrows reproduced on the casing 2), so as to move the band 10, which then unwinds progressively from one of the two rollers 11 or 12 and winds about the other, until the decompression table relative to the depth and time values read on the depthometer 5 and minute timer 8 appears in the window 76. In this manner, the user knows the number and duration of the decompression pauses which are necessary, and the depth at which they have to be made. He can therefore rise exactly to the prescribed depths by following the readings of the pointer 28 of the depthometer 5, and can accurately control the duration of his decompression pauses by means of the minute timer 8, on which the time determined from the tables is set as required by means of the ring 40. At the same time, the minute timer 8 continues to indicate the total immersion time by means of the reference marker 58, so that the user can also check the duration of the air supply.

The advantages of the present invention are apparent from the aforegoing description. It enables all the control devices necessary for the diver to be able to carry out an immersion safely, to be housed in a single instrument in a simple and rational manner. The instrument thus produced is very compact and thus of small size, and can be consulted in a simple and rational manner.

What we claim is:

1. An underwater instrument for the combined reading of immersion time and depth, and decompression time, comprising, in combination, a depthometer (5), a clock device (8), a support (10) for decompression tables, and a casing (2) on which said depthometer (5), clock device (8) and support (10) are mounted in mutually side-by-side positions so as to be simultaneously consultable, said support for said decompression table being housed in said casing (2), and comprising a flexible band (10), and two drums (11,12) rotatably mounted in said casing (2), the opposing ends of said band (10) being wound in opposite directions about said two drums (11,12).

2. An instrument as claimed in claim 1, characterised in that said clock device (8) comprises first ring means (41) arranged to provide an indication of the total immersion time on a graduated dial (45), and second ring means (40) arranged to provide an indication of a plurality of partial immersion times.

3. An instrument as claimed in claim 1, characterised by further comprising correction tables (79) relative to decompression pauses for subsequent immersions; said correction tables (79) being reproduced on a side surface (3) of said casing (2).

4. An instrument as claimed in claim 1, characterised in that said casing (2) is substantially in the shape of an elongated parallelepiped bounded at its front by a surface (7) comprising a first and second transverse cup seat (6, 9) engaged respectively by said depthometer (5) and said clock device (8); said casing comprising a further longitudinal seat (13) extending between one of said two first seats (6, 9) and a rear surface (3) of said casing (2); said further seat (13) housing said support (10) for said decompression tables, and these latter being visible from the outside through a window (76) provided in said casing (2).

5. An instrument as claimed in claim 4, characterised in that said depthometer is a diaphragm depthometer comprising a flexible diaphragm (16) disposed facing a base wall (30) of said first seat (6); said base wall (30) comprising at least one through bore (35) communicating with the outside.

* * * * *